(12) United States Patent
Liu et al.

(10) Patent No.: US 10,387,243 B2
(45) Date of Patent: Aug. 20, 2019

(54) MANAGING DATA ARRANGEMENT IN A SUPER BLOCK

(71) Applicant: Macronix International Co., Ltd., Hsinchu (TW)

(72) Inventors: Ting-Yu Liu, Hsinchu (TW); Yi-Chun Liu, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 15/835,859

(22) Filed: Dec. 8, 2017

(65) Prior Publication Data

US 2019/0179698 A1    Jun. 13, 2019

(51) Int. Cl.
*G06F 12/00* (2006.01)
*G06F 11/10* (2006.01)
*G06F 3/06* (2006.01)
*G06F 12/02* (2006.01)

(52) U.S. Cl.
CPC .......... *G06F 11/1048* (2013.01); *G06F 3/064* (2013.01); *G06F 12/0246* (2013.01); *G06F 2212/7201* (2013.01); *G06F 2212/7202* (2013.01); *G06F 2212/7208* (2013.01)

(58) Field of Classification Search
CPC .... G06F 12/0246; G06F 3/064; G06F 3/0688; G06F 2212/7203; G06F 3/0679; G06F 11/1068; G06F 3/061; G06F 2212/1016; G06F 2212/202; G06F 2212/2022; G06F 2212/7207; G06F 3/0644
USPC ........................................................ 711/170
See application file for complete search history.

(56) References Cited

U.S. PATENT DOCUMENTS

| | | | |
|---|---|---|---|
| 7,359,245 B2 | 4/2008 | Kim et al. | |
| 8,095,765 B2 | 1/2012 | Asnaashari et al. | |
| 8,239,614 B2 | 8/2012 | Asnaashari et al. | |
| 8,751,731 B2 | 6/2014 | Asnaashari et al. | |
| 8,832,507 B2 | 9/2014 | Post et al. | |
| 2005/0172065 A1* | 8/2005 | Keays ................ | G06F 11/1068 711/103 |
| 2008/0052446 A1 | 2/2008 | Lasser et al. | |
| 2011/0055458 A1 | 3/2011 | Kuehne | |
| 2016/0180926 A1* | 6/2016 | Young ..................... | G11C 8/08 714/773 |

(Continued)

FOREIGN PATENT DOCUMENTS

TW    201510722 A    3/2015

*Primary Examiner* — Mardochee Chery
(74) *Attorney, Agent, or Firm* — Fish & Richardson P.C.

(57) ABSTRACT

Systems, methods, and apparatus including computer-readable mediums for managing data arrangement in a super block in a memory such as NAND flash memory are provided. In one aspect, a memory controller includes control circuitry coupled to the memory having at least two planes of physical blocks and configured to determine one or more characteristics of data to be written, allocate a super page of a super block based on the determined characteristics of the data and block information of the physical blocks of the planes, the super block combining one or more physical blocks from the planes, the super page combining one or more single pages from the corresponding one or more physical blocks in the super block, arrange the data to the one or more single pages in the super page, and program the super page to write the data in the one or more single pages.

20 Claims, 12 Drawing Sheets

(56) References Cited

U.S. PATENT DOCUMENTS

2016/0283138 A1    9/2016    Lehman et al.

* cited by examiner

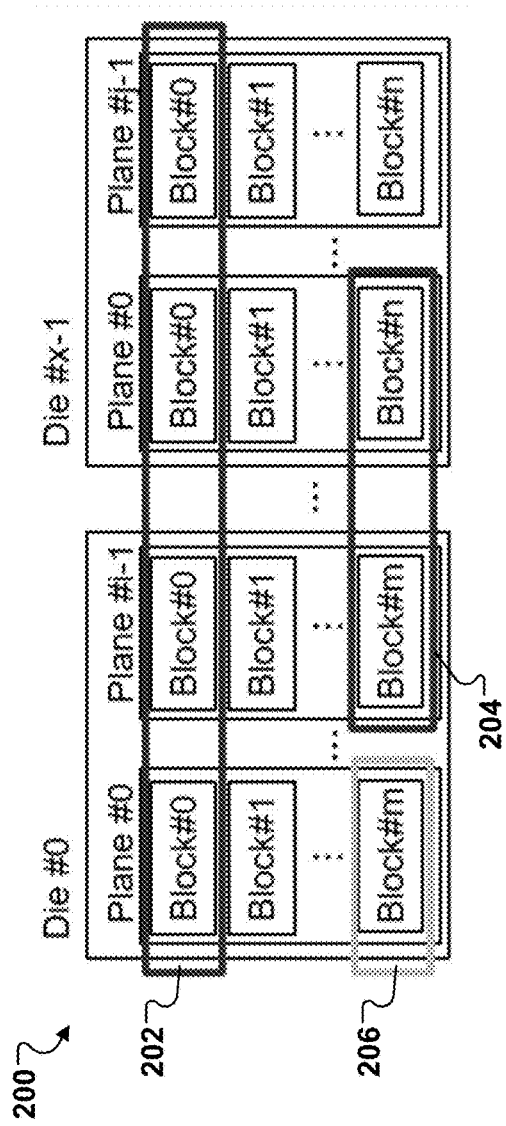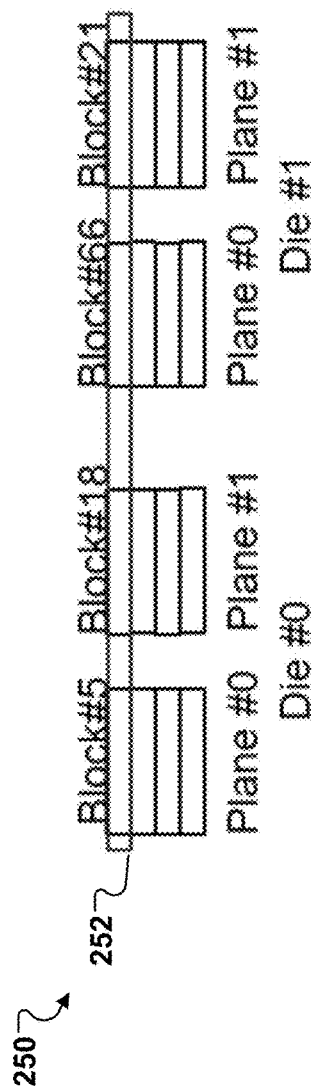
FIG. 2A
FIG. 2B

US 10,387,243 B2

MANAGING DATA ARRANGEMENT IN A SUPER BLOCK

BACKGROUND

To manage a memory such as a NAND flash memory, logical super blocks can be specified such that each super block combines multiple physical blocks from different planes in the memory. The physical blocks in a super block can be operated simultaneously. However, normally the super blocks are initially specified in the memory, each super block is managed as a whole block where the combination of the physical blocks never changes until one of them wears out, and there is no optimal arrangement of data within the super block, which may cause poor efficiency.

SUMMARY

The present disclosure describes systems and techniques for managing data arrangement in a super block in a memory, e.g., a non-volatile memory system such as NAND flash memory, which can improve (or optimize) efficiency by managing physical blocks and data arrangement with a fine granularity.

One aspect of the present disclosure features a memory controller for managing data arrangement in a memory, including control circuitry coupled to the memory having at least two planes of physical blocks and configured to determine one or more characteristics of data to be written in the memory, allocate a super page of a super block based on the determined characteristics of the data and block information of the physical blocks of the planes, the super block combining one or more physical blocks from the planes, the super page combining one or more single pages from the corresponding one or more physical blocks in the super block, arrange the data to the one or more single pages in the super page, and program the super page to write the data in the one or more single pages.

The control circuitry can be configured to allocate the super page of the super block by determining that the super block includes the super page that is blank and suitable to store the data. The control circuitry can be configured to allocate the super page of the super block by selecting the one or more physical blocks from the planes based on the block information of the physical blocks of the planes, erasing each of the selected physical blocks based on the determined characteristics of the data, and combining the one or more single pages from the one or more physical blocks in the planes to the super page.

In some implementations, the control circuitry is configured to arrange the data to the one or more single pages in the super page by preparing data in a first blank single page in the super page, determining that there is a second blank single page in the super page, and preparing data in the second blank single page. In some cases, the control circuitry is configured to prepare data in the first blank single page by determining that the data has a characteristic corresponding to a characteristic of a first physical block including the first blank single page, and filling in the data in the first blank single page. In some cases, the control circuitry is configured to prepare data in the first blank single page by, in response to a determination that there is free space in the first blank single page, picking reclaim data from one or more victim blocks, the reclaim data having a characteristic corresponding to the characteristic of the first physical block and filling in the data and the reclaim data in the first blank single page. In some cases, the control circuitry is configured to determine that the data has the characteristic corresponding to the characteristic of the first physical block by determining at least one of the data includes reliable data and the first physical block is an SLC block, the data includes normal data and the first physical block is one of an MLC block, a TLC block and a QLC block, or the data includes hot data and the first physical block has an erase count less than at least one other physical block in the super block.

In some implementations, the control circuitry is configured to program the super page by simultaneously programming each of the one or more single pages with the data by a respective program feature, the respective program feature of the single page corresponding to a characteristic of data arranged to the single page. In some cases, the data includes reliable data arranged to the single page, and the single page is an SLC page. In some cases, the data includes normal data arranged to the single page, and the single page is an MLC page, and the normal data is programmed into the single page by one of full sequence programming method and LM programming method.

In some examples, the data is associated with a command, and the controller circuitry is configured to analyze the characteristics of the data according to the demand. In some cases, the demand includes at least one of: a write demand for writing data from a host externally coupled to the memory, a reclaim demand for migrating valid data in at least one victim block in the memory, or a system demand for storing metadata associated with the memory, and the data includes at least one of the data from the host, the reclaim valid data, or the metadata. In some cases, the demand comprises a sequential write demand, and the control circuitry is configured to allocate the super page of the super block by combining a maximum number of physical blocks from the planes to the super block and erasing each physical block in the super block to be a block with one type of SLC, MLC, TLC, and QLC.

The control circuitry can be configured to categorize the data based on the determined characteristics of the data, and the control circuitry can be configured to arrange the data to the one or more single pages in the super page by arranging the categorized data according to the determined characteristics into different singles pages in the super page, such that data with a same characteristic is gathered in a same single page.

In some cases, the control circuitry is configured to categorized the data according to at least one of data source, access frequency, system or cache, or data or metadata. In some cases, the control circuitry is configured to: determine that the data includes different types of data according to the determined characteristics of the data, and allocate the super page of the super block by preparing a respective single page for each of the different types of the data in the super page.

In some implementations, the control circuitry is configured to maintain the block information of each individual physical block in the planes, and the block information of a physical block in the planes comprises one or more parameters including block type, erase count, valid count, read counts, erase delay time, a first flag indicating whether the physical block is in a current data block, and a second flag indicating whether the physical block is an unused block. In some cases, the control circuitry is configured to combine a plurality of super blocks, each of the super blocks being configured for a respective type of data.

Another aspect of the present disclosure features a memory system including: a memory comprising physical blocks and a controller configured to manage data arrangement in the memory by determining one or more characteristics of data to be written in the memory, allocating a super page of a super block based on the determined characteristics of the data and block information of the physical blocks, the super block combining one or more physical blocks from the memory, the super page combining one or more single pages from the corresponding one or more physical blocks in the super block, arranging the data to the one or more single pages in the super page, and programming the super page to write the data in the one or more single pages.

A further aspect of the present disclosure features a method of managing data arrangement in a memory, including: maintaining, by a control circuitry, block information of individual physical blocks in the memory; allocating, by the control circuitry, a super page of a super block according to a demand and the block information of the physical blocks of the memory, the super block combining at least one physical block from the memory, the super page combining at least one single page from the corresponding at least one physical block in the super block; preparing, by the control circuitry, data in the at least one single page of the super page, the data comprising data associated with the demand; and programming, by the control circuitry, the super page to write the data in the at least one single page.

Implementations of the above techniques include methods, circuits, systems, computer program products and computer-readable media. In one example, a method can be performed by a memory controller coupled to a non-volatile memory, and the method can include the above-described actions performed by the memory controller, e.g., the actions for managing block arrangements of super blocks. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The techniques can maintain block information, e.g., erase count and/or valid count, of each single physical block in different planes of a memory and refer to the information to combine (or arrange) at least one physical block in the different planes for write data, reclaim data and/or metadata. Note that block information of a block mainly refers to information associated with usage of the block including erase count, valid count, read count by page, erase delay time, unused flag, or CDB flag, and the block information may not include memory address of the block and/or a block number (or a position number) in its plane. The techniques provide a scatter/gather scheme to optimize efficiency by a fine granularity, e.g., by categorizing data according to its characteristics (e.g., hot/cold, system/cache, data/metadata) and scattering data by its characteristics when programming a super page to gather data with the same (or similar) characteristics in the same physical blocks. Compared to binding physical blocks in a super block for management, the techniques can improve reclaim efficiency, reduce data migration, reduce erase counts of the physical blocks, and solve performance and lifetime degrading problems caused by unnecessary copying. The techniques can operate multiple physical blocks in a super block simultaneously and gain a maximum bandwidth for data throughput. The techniques can be implemented by any appropriate type of controller to improve efficiency of the memory. The controller can be part of the memory, reside in a host coupled to the memory, or externally coupled to the host and the memory and/or cooperating with the host. The controller can include flash transition layer (FTL) management.

The techniques can be applied to various memory types, such as SLC (single-level cell) devices, MLC (multi-level cell) devices like 2-level cell devices, TLC (triple-level cell) devices, QLC (quad-level cell) devices, or any suitable combination thereof. The techniques can be applied to various types of non-volatile memory systems, such as NAND flash memory, NOR flash memory, AND flash memory, phase-change memory (PCM), or others. Additionally or alternatively, the techniques can be applied to various types of devices and systems, such as secure digital (SD) cards, embedded multimedia cards (eMMC), solid-state drives (SSDs), embedded systems, hard disks, optical disks, tapes, or others. The systems can be mixed systems including more than one type of storage devices above.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 2A illustrates example super blocks specified in a memory, according to one or more implementations.

FIG. 2B illustrates another example super block in a memory, according to one or more implementations.

DETAILED DESCRIPTION

Figure 1:
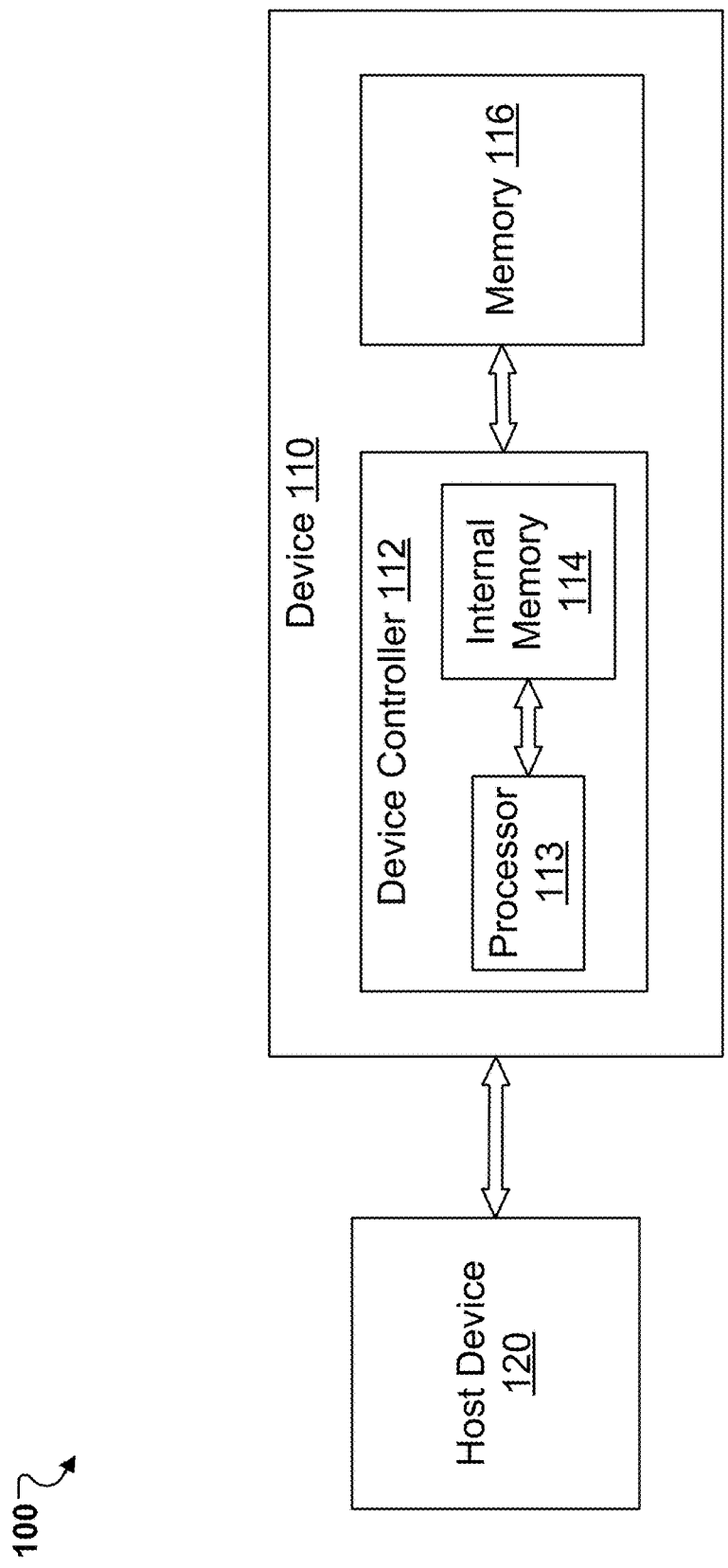
FIG. 1 illustrates an example of a system for memory management, according to one or more implementations.

FIG. 1 illustrates an example of a system 100 for memory management. The system 100 includes a device 110 and a host device 120. The device 110 includes a device controller 112 and a memory 116. The device controller 112 includes a processor 113 and an internal memory 114.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to the host device 120. For example, the device 110 is an SD card in a digital camera or a media player that is the host device 120.

The device controller 112 can be a general-purpose microprocessor, or an application specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller. The device controller 112 can be also included in the host device 120 or externally coupled to the host device 120 or the device 110.

The processor 113 is configured to execute instructions and process data. The instructions include firmware instructions and/or other program instructions that are stored as firmware code and/or other program code, respectively, in the internal memory 114. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory 114 is a cache memory that is included in the device controller 112, as shown in FIG. 1. The internal memory 114 stores instruction codes, which correspond to the instructions executed by the processor 113, and/or the data that are requested by the processor 113 during runtime.

The device controller 112 transfers the instruction code and/or the data from the memory 116 to the internal memory 114. In some implementations, the memory 116 is a non-volatile memory that is configured for long-term storage of instructions and/or data, e.g., a NAND flash memory device, or some other suitable non-volatile memory device. In implementations where the memory 116 is NAND flash memory, the device 110 is a flash memory device, e.g., a flash memory card, and the device controller 112 is a NAND flash controller. For example, in some implementations, when the device 110 is an eMMC or an SD card, the memory 116 is a NAND flash; in some implementations, when the device 110 is a digital camera, the memory 116 is an SD card; and in some implementations, when the device 110 is a media player, the memory 116 is a hard disk. For illustration purposes only, the following description uses a NAND flash memory as an example of the memory 116.

The device controller 112 can be configured to manage block arrangement of super blocks in the memory 116 as described in U.S. patent application Ser. No. 15/836,476, entitled "MANAGING BLOCK ARRANGEMENT OF SUPER BLOCKS" and filed on the same date herewith, whose contents are hereby incorporated by reference in their entirety. For example, the device controller 112 can maintain block information based on individual physical blocks, instead of a whole super block, select a free block in a plane based on a strategy, e.g., based on erase count, unused block count, total valid count, and/or erase delay time, combine at least one block in different planes to a super block, and/or select a victim block in a plane based on a strategy, e.g., based on greedy, refresh, or wear-leveling.

The device controller 112 can categorize data according to one or more characteristics. The terms "character" and "characteristic" may be used interchangeably herein. In some examples, data is categorized according to data sources. A first data source can be a write command for update data from the host device 120. The data is external to the memory 116 (or the device 110) and can be user data. A second data source can be a block reclaim to migrate valid data from one or more victim blocks to a super block (or a current data block). The data can be considered as reclaim data. A third data source can be metadata of the memory 116 (or the device 110), e.g., system management data such as FTL table. The reclaim data and the metadata are internal to the memory 116 (or the device 110).

In some examples, data is categorized according to an access frequency. In some cases, the access frequency of data can be judged by counting read, write, or migrate count before update. In some cases, the access frequency of data can be determined by a delta time of last access, e.g., a period between the last read and the current update time. A degree of hotness (or coldness) is determined based on the access frequency of the data. The higher the access frequency of data is, the hotter the data is.

In some examples, data is categorized to be at a security level, an internal system level, or a normal data level. At the normal data level, data can be categorized to have a degree of hotness based on frequent write & read (or an access frequency). For example, the degree of hotness of data can be gradually reduced from (1) data with frequent read & write, (2) data with frequent write but seldom read, (3) data with seldom write but frequent read, to (4) data with seldom read & write. Data at the security level can include secure or reliable data, which can be considered as hot data. Data at the internal system level can include system management data, which can be considered as hot data.

In some examples, data is categorized according to system or cache. In some cases, a hint can be obtained from one or more parameters of a command, e.g., from the host device 120, to distinguish normal, system, or cache data. For example, the command can include a flag to indicate system data and/or another flag to indicate cache data. System data and/or cache data can be designated as hot data. As another example, if data associated with the command is less than a predetermined length, e.g., 16 kilobits (kB), the data can be categorized as hot data. If data associated with the command is more than a predetermined length, e.g., 128 kB, the data can be categorized as cold data.

In some cases, the device controller 112 can categorize data by access address and/or length. If the access address is in an internal system region, e.g., file allocation table (FAT), the data is categorized as internal system data (and/or hot data). If the length of the data is less than a threshold, e.g., 16 kB, the data can be considered as cache data (and/or hot data).

As discussed with further details below, the device controller 112 can be configured to manage data arrangement in a super block. For example, the device controller 112 can specify a super block or allocate a super page, in response to a demand, e.g., a request to write external data from the host device 120, to migrate valid data from a victim block, and/or to store metadata of the memory 116. The device controller 112 can categorize data according to its characteristics (e.g., hot/cold, system/cache, and/or data/metadata), as noted above, and scatter data by the characteristics when programming a super page to gather data with the same characteristics in a same physical block. Particularly, the device controller 112 can arrange data placement by strategies, e.g., unused block count/erase count by plane, to evenly scatter data with different characteristics in different planes, and gather data with analogous characteristics, e.g., adjacent logical address/accessed frequency, in the same plane.

FIG. 2A illustrates example super blocks specified in a memory. The memory can be the memory 116 of FIG. 1. The memory can include one or more memory devices. In some implementations, the memory includes a number of dies. Each die can be a memory chip and include a number of memory arrays and peripheral circuitry thereon. A memory array can include a number of planes, with each plane including a number of physical blocks of memory cells. Each physical block can include a number of pages of memory cells that can store a number of sectors of data.

Two physical blocks from a common plane cannot be operated (e.g., erased) simultaneously, but two physical blocks from different planes can be operated simultaneously. A super block can be specified, e.g., by a memory controller such as the controller 112 of FIG. 1, to combine at least one physical block from different planes. Each physical block in the super block comes from a different plane, that is, any plane cannot provide more than one block in the super block. The super block includes a number of super pages each combining multiple pages from the corresponding multiple physical blocks in the super block. Each page in a super page can have a same page number in its corresponding physical block. A super page can be programmed with all the pages in the super page being programmed simultaneously.

As illustrated in FIG. 2A, the memory includes x dies from Die#0 to Die#x-1. Die#0 includes i planes from Plane#0 to Plane#i-1, and each of the planes includes m+1 physical blocks, where 0, 1, . . . , or m is a position number indicating a corresponding block's physical location within its plane. Die#i-1 includes j planes from Plane#0 to Plane#j-1, and each of the planes includes n+1 physical blocks, where 0, 1, . . . , or n is a position number indicating a corresponding block's physical location within its plane. Each of x, i, and j is an integer larger than 1 and each of m and n is an integer larger than 0, where i=j or i≠j, m=n or m≠n. In some examples, the memory includes multiple dies, and each die include one plane.

In some examples, a super block includes a number of blocks with a same position number. A super block can include one block from each plane of each dies in the memory; this provides a maximum bandwidth. For example, as illustrated in FIG. 2A, super block 202 includes the blocks with position number 0 from each of the planes in the memory. However, a super block can include blocks with a same position number, but from less than all of the planes, e.g., from less than all dies or less than all planes within a die. For example, super block 204 includes blocks from multiple dies, but not all planes within each die. Thus, super block 204 has less blocks than super block 202 and has a smaller bandwidth. Super block 206 includes only one physical block, e.g., Block#m from one plane, e.g., Plane#0 in Die#0.

In some examples, a super block combines physical blocks with different position numbers from different planes. As illustrated in FIG. 2B, example super block 250 combines Block#5 from Plane#0 in Die#0, Block#18 from Plane#1 in Die#0, Block#66 from Plane#0 in Die#1, and Block#21 from Plane#1 in Die#1. Super page 252 combines four pages from the four blocks in super block 250. The four pages have a same page number in their blocks and can be programmed simultaneously when super page 252 is programmed.

In some examples, a super block combines blocks of the same memory type from different planes, e.g., SLC, MLC, TLC, or QLC. In some examples, a super block combines blocks from different memory types, e.g., mixed SLC & MLC, from different planes.

As discussed in further details below, a super block can be deployed to write update data, e.g., data outside the memory like data from a host device, to migrate valid data, e.g., data inside the memory, or to write metadata, e.g., data for FTL management. A super block can also be released the combination of blocks if it cannot write/migrate anymore.

Figure 3:
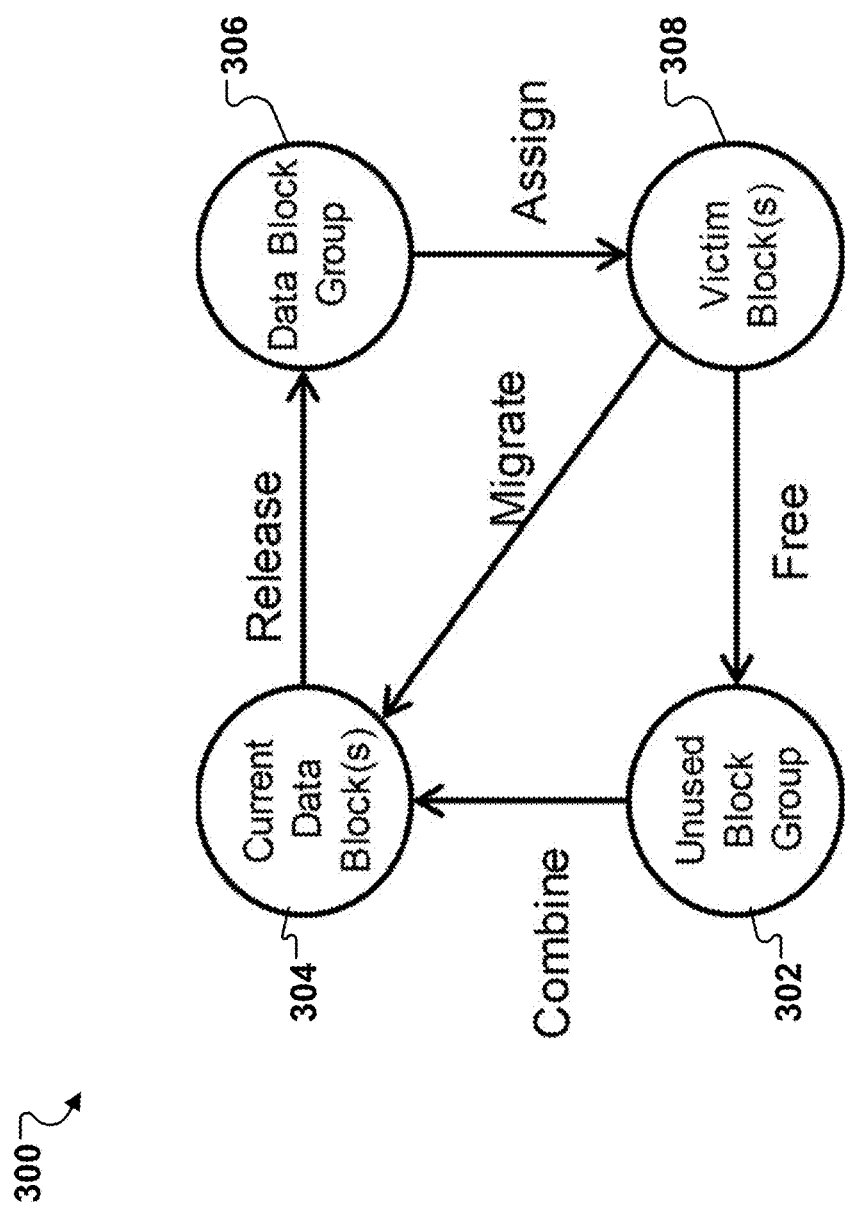
FIG. 3 illustrates an example state diagram of managing blocks in a memory, according to one or more implementations.

FIG. 3 illustrates an example diagram 300 of managing blocks in a memory. The memory can be the memory 116 of FIG. 1, and can be managed by a controller, e.g., the controller 112 of FIG. 1. The diagram 300 shows an overview of managing block arrangement of super blocks in the memory by the controller.

The memory includes a number of planes each having one or more physical blocks. Two-level configuration can be classified to control the physical blocks in the memory. The first level is single block level where data blocks, unused blocks (e.g., free blocks or empty blocks), and victim blocks are. As discussed with further details below, a victim block is a block to be reclaimed into an unused block. The second level is super block level where super blocks are current data blocks (CDBs) that are open for data writing.

Initially, for example, when the memory is initialized, the physical blocks in the memory are put into unused block group 302 that is managed at the single block level. The controller maintains block information of individual physical blocks in unused block group 302. The block information is described with further details in FIGS. 4A and 4B.

The controller can select no more than one physical block from each of the planes and combine the selected physical blocks to obtain a super block based on the block information of the physical blocks in the planes, according to one or more strategies, e.g., based on erase count, valid count balance, and/or erase delay time. The super block includes at least one physical block combined from the planes. The controller can combine one or more super blocks (or CDBs) in the memory. The CDBs are in current data block group 304 that is managed at the super block level.

When a super block (or a current data block) is incapable of storing more data, the current data block is released as individual data blocks to data block group 306 that is managed at the single block level.

A data block in data block group 306 can be assigned as a victim block according to one or more strategies, e.g., based on greedy, refresh, or wear-leveling. The victim block is put in victim block group 308 that is managed at the single block level.

A reclaim operation can be performed on one or more victim blocks in victim block group 308. Valid data in the victim blocks can be migrated to one or more super blocks (or CDBs) in current data block group 304. Then a victim block full of invalid data can be freed, e.g., erased, to become unused blocks, which can be pushed to unused block group 302.

As noted above, current data block group 304 is managed at the super block level, while each of unused block group 302, data block group 306, and victim block group 308 is managed at the single block level. In such a way, this memory can be managed with a fine granularity, which can improve or optimize efficiency of the memory.

Figure 4A:
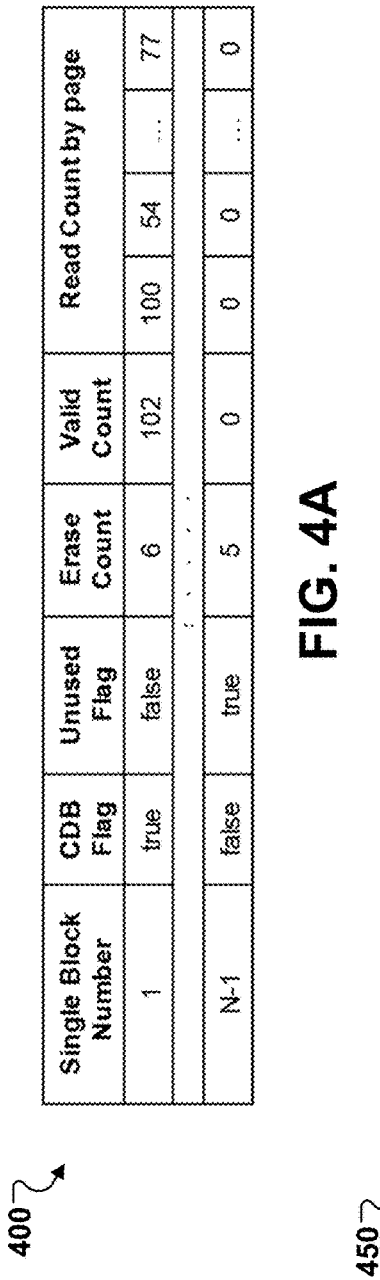
FIG. 4A illustrates an example block information table of a plane in a memory, according to one or more implementations.

FIG. 4A illustrates an example block information table 400 of a plane in a memory. The memory can be the memory 116 of FIG. 1, and the plane can be any plane in FIG. 1, e.g., Plane#0 in Die#0. The plane can include N−1 number of physical blocks. Each plane can have its own table that is independent from other planes in the same memory. A memory controller, e.g., the controller 112 of FIG. 1, can manage the block information table for each plane in the memory. As illustrated in table 400, the block information can include a number of parameters as discussed below.

A CDB flag field indicates whether a single block is in a current data block (CDB). If the CDB flag is true, the single block is in a CDB. If the CDB flag is false, the single block is not in a CDB and can be a data block, e.g., in data block group 306 of FIG. 3, or an unused block, e.g., in unused block group 302 of FIG. 3.

An unused flag field can indicate whether a single block is an unused data block. If the unused flag is true, the single block can be picked to a current data block, and its valid count and read count are set to 0. If the unused flag is false, the single block can be in a CDB or a data block in data block group.

An erase count field is used to record a number of times that a single block is executed by an erase operation. Erase count is related to P/E (program/erase) cycles of the single block. When erase count is beyond a threshold, the single block can be considered to be an urgent block or a bad block that has worn out.

A valid count field is used to record how many valid data is stored in a single block. The larger the valid count is, the more valid data is stored, which indicates the less unused count is left and the faster the single block is used up or becomes a data block in data block group. A total valid count (or a total of valid counts) of a plane is a sum of valid counts of all the blocks in the plane.

Read count by page records how many times each page in a single block was read. Read count can also record how many times the single block was read, that is, a sum of read operation on the single block.

As an example, as shown in FIG. 4A, for block number 1, the CDB flag is true, the unused flag is false, the erase count is 6, the valid count is 102, and the read count by page is respectively 100, 54, . . . , 77. For block number N−1, the CDB flag is false, the unused flag is true, the erase count is 5, the valid count is 0, and the read count by page is all 0.

Figure 4B:
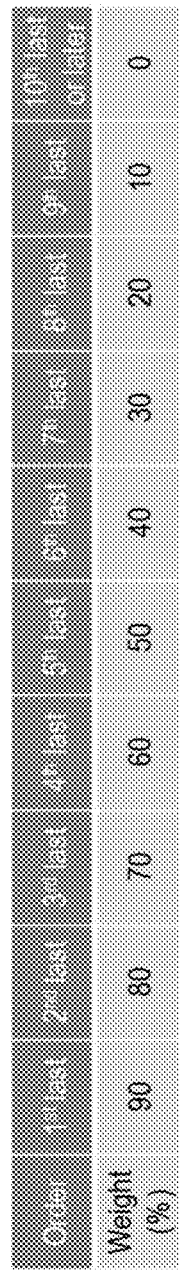
FIGS. 4B-4C illustrate examples of erase information tables of a block, according to one or more implementations.

The block information can also include erase delay time for a single block, which records a period of time from a latest time point when the single block was erased to a current time point. FIG. 4B shows an example erase information table 450, which includes erase order, e.g., from $1^{st}$ last to $10^{th}$ last, and associated weight (%). The smaller the erase order is, the higher the weight is. For example, as shown in FIG. 4B, from $1^{st}$ last to $10^{th}$ last erase order, the weight is 90%, 80%, 70%, . . . , 0, respectively.

Figure 4C:
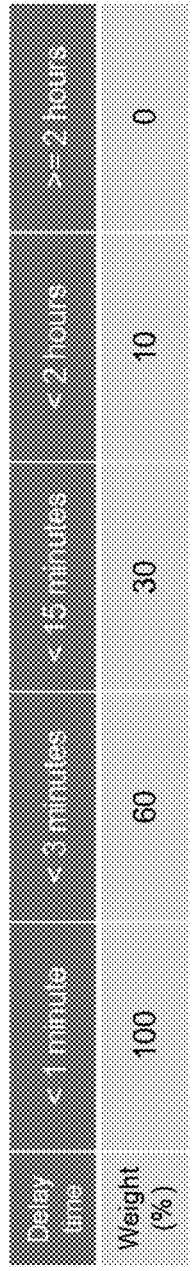

FIG. 4C shows another example erase information table 470, which includes erase delay time and associated weight (%). The less the erase delay time is, and the higher the weight is. As shown in FIG. 4C, the weight is 100% for the erase delay time (EDT) of less than 1 min, 60% for the erase delay time less than 3 min, 30% for the erase delay time less than 15 minutes, 10% for the erase delay time less than 2 hours, and 0 for the erase delay time no less than 2 hours, respectively.

The erase information tables 450 and/or 470 can be used to prevent frequently erasing block in a short time, which may cause wear out memory cells seriously. In some cases, "order" or "delay time" can be used as a meter to restrain picking a free block and/or selecting a victim block. For example, during picking a free block, the controller can get a respective erase count of each free block and refer to table 450 or 470 to get a respective weight of the free block. Then, for each free block, a respective weighted number can be calculated by multiplying the respective weight by a number, e.g., a maximum erase count of all of the free blocks. The controller can then pick a free block by comparing a sum of the respective erase count and the respective weighted number among the free blocks. For example, the controller can pick a free block with the smallest sum of the respective erase count and the respective weighted number.

In some cases, the controller can select a victim block according to a procedure similar to picking a free block. The controller can get a respective erase count of each candidate victim block and refer to table 450 or 470 to get a respective weight of the candidate victim block. Then, for each candidate victim block, a respective weighted number can be calculated by multiplying the respective weight by a number, e.g., a maximum valid count of all of the candidate victim blocks. The controller can then select a victim block by comparing a sum of a respective valid count and the respective weighted number among the candidate victim blocks. For example, the controller can select a victim block with the largest sum of the respective valid count and the respective weighted number.

Figure 5:
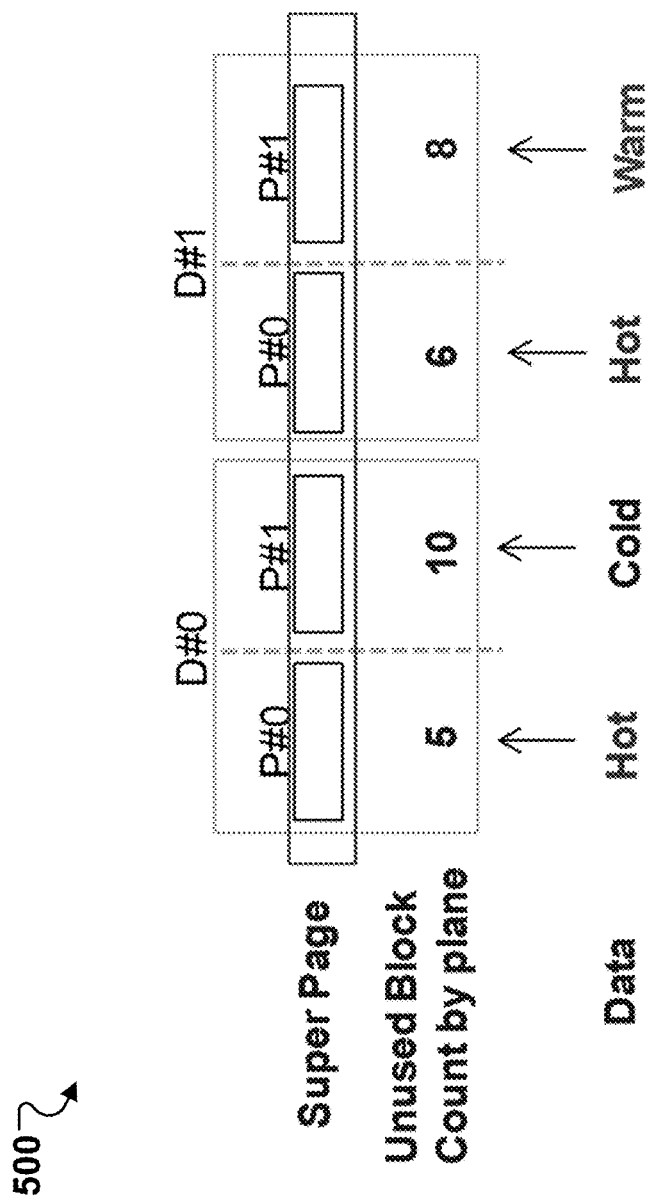
FIG. 5 illustrates an example of arranging data to a super page based on unused block count, according to one or more implementations.

FIG. 5 illustrates an example 500 of arranging data to a super page of a super block. The data arrangement can be based on one or more characteristics of the data and one or more characteristics of physical blocks in the super block. The characteristics of the physical blocks can be maintained in block information tables of corresponding planes including the physical blocks, e.g., the tables 400 of FIG. 4A and 450 of FIG. 4B.

In some examples, the super block combines the physical blocks from planes with close unused block counts. As illustrated in FIG. 5, the super block combines four physical blocks from four respective planes in dies D#0 and D#1. The unused block count for each of the planes is 5, 10, 6, and 8, respectively.

As noted above, data can be characterized according to its characteristic such as hotness/coldness. As an example shown in FIG. 5, data to be written includes four groups of data: first hot data, second hot data, warm data, and cold data. The four groups of data can be arranged to respective pages in a super page of the super block based on its characteristic and characteristics of the blocks in the super block.

In some examples, a plane with unused block count less than others may have more valid data than others. As hot data is easier to become invalid data than cold data, the hot data can be put in a block of the plane with less unused block count. In such a way, the block can be easier to be reclaimed to an unused block, and the unused block counts of the planes can be balanced. As illustrated in FIG. 5, the first hot data is arranged to a block in plane P#0 with 5 unused block count in D#0, the second hot data is arranged to a block in plane P#0 with 6 unused block count in D#1, the warm data is arranged to a block in plane P#1 with 8 unused block count in D#1, and the cold data is arranged to a block in plane P#1 with 10 unused block count in D#0.

Figure 6:
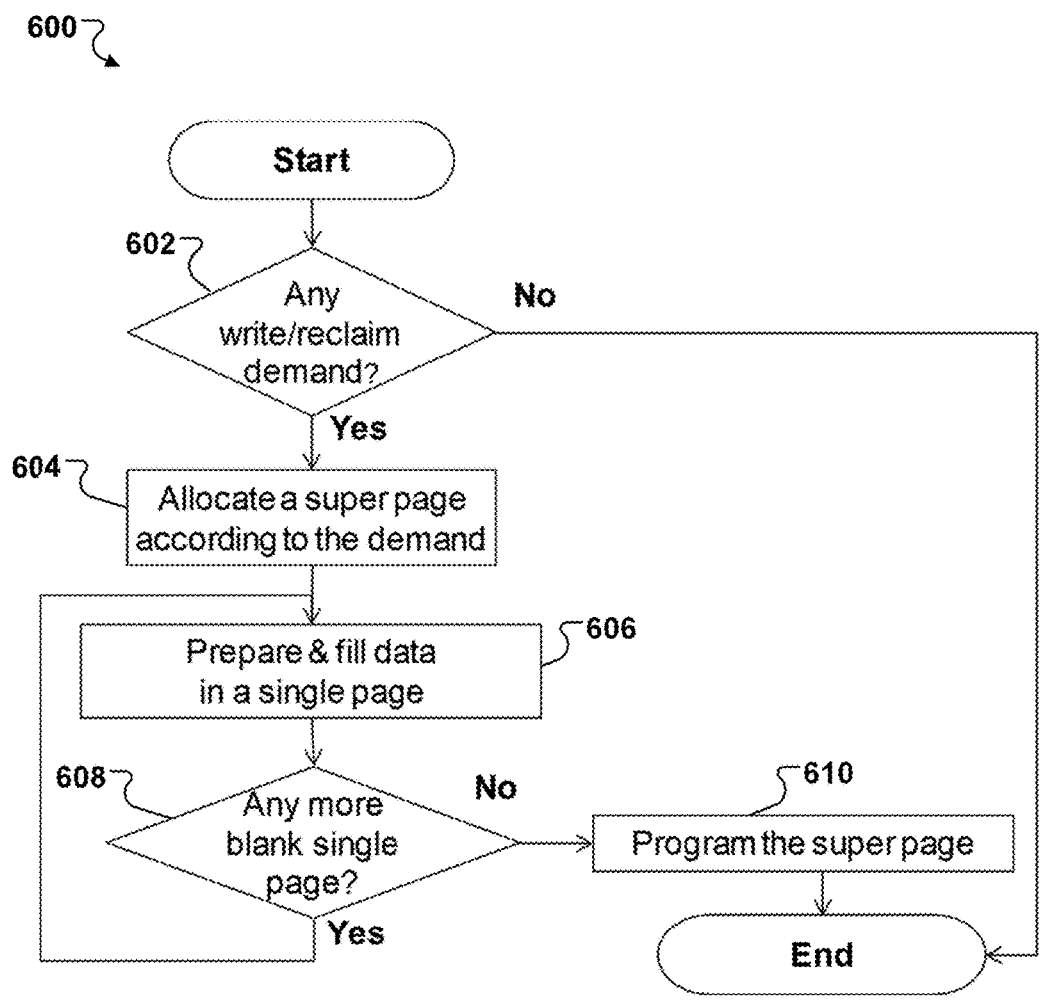
FIG. 6 illustrates an example of a process for writing data from a demand to a super page of a super block, according to one or more implementations.

FIG. 6 illustrates an example of a process 600 for writing data from a demand to a super page of a super block in a memory. The memory can be the memory 116 of FIG. 1, and the process 600 can be performed by a controller, e.g., the controller 112 of FIG. 1. The controller can scatter the data by its characteristic and then gather data with the same characteristic in a single block.

The controller determines whether there is any write/reclaim demand (602). As noted above, in some examples, the demand is a write demand from a host device, e.g., the host device 120 of FIG. 1, externally coupled to the memory. The demand can include a request to write data, e.g., user data, from the host device into the memory. In some examples, the demand is a block reclaim request to internally migrate valid data from a victim block in the memory to a super block (or a current data block) in the memory. In some examples, the demand is to write metadata of the memory 116, e.g., system management data such as FTL table. The demand can also include two or more of the write demand, the block reclaim request, and the metadata write demand.

If the controller determines that there is no write/reclaim demand, the process 600 ends. If the controller determines that there is a write/reclaim demand, the controller allocates a super page according to the demand (604), for example, as discussed with further details in FIG. 7.

Before allocating the super page, the controller can categorize data associated with the demand. As noted above, the data can be categorized according to data sources, access frequency, system or cache, and/or data or metadata. Different types of blocks can be suitable to store different characteristics of data. For example, an SLC block is suitable for storing reliable data, while an MLC block is suitable for storing normal data, e.g., user data from a host device. An MLC block can store more data than an SLC block and can be used to store data stream from a sequential write demand. A block with a smaller erase count is suitable for storing hot data, while a block with a larger erase count is suitable for storing cold data or reclaim data.

The allocated super page can combine one or more single pages from corresponding physical blocks in the super block. The controller performs a loop to arrange data in the super page. The controller prepares & fills data in a single page in the super page (606), for example, as discussed with further details in FIG. 8. Then the controller determines whether there is any more blank single page in the super page (608). If the controller determines that there is a blank single page in the super page, the process goes back to step 606 to continue the loop.

If the controller determines that there is no more blank single page in the super page, that is, all the single pages in the super page are assigned with data, the controller programs the super page 610, that is, to program the data into all the single pages in the super page simultaneously.

Figure 7:
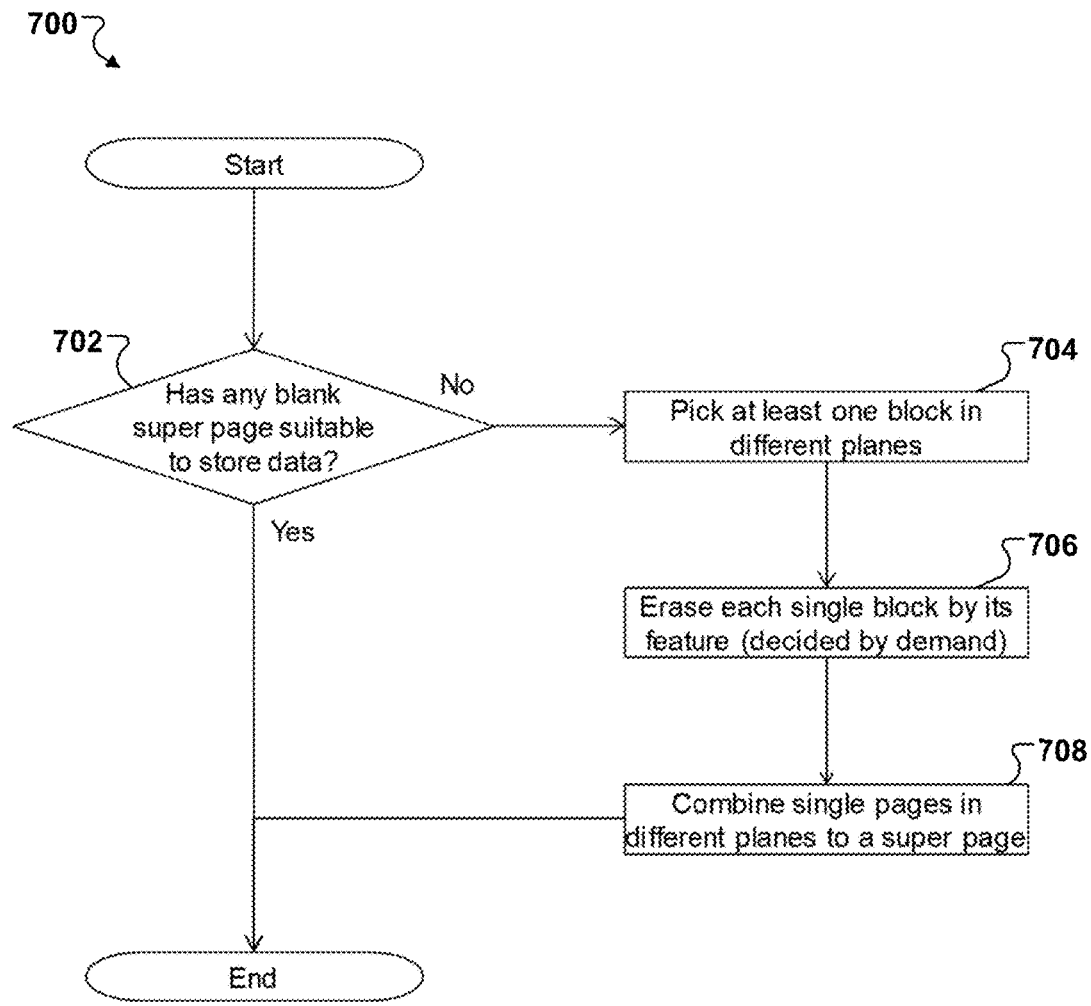
FIG. 7 illustrates an example of a process for allocating a super page according to a demand, according to one or more implementations.

FIG. 7 illustrates an example of a process 700 for allocating a super page in a super block according to a demand. The process 700 can be performed as step 604 of FIG. 6 by the controller of FIG. 6. The demand can be the demand of FIG. 6.

The controller determines whether there is any blank super page suitable to store data (702). If the controller determines that there is a super page suitable to store the data, the controller allocates the super page to store the data and the process 700 ends. The controller can proceed to perform step 606 in FIG. 6.

In some cases, the controller determines that there is no blank super page suitable to store the data. For example, the data is secure data. However, the super page does not combine a single SLC page, thus the super page is not suitable to store the data. In some examples, the controller refers to a table associating different types of data with different types of page (or block). For example, reliable data including secure data and system data can be associated with a page with SLC type, and normal data including user data and stream data can be associated with a page with MLC type. If the controller determines, based on the table, that a blank super page has one or more single pages associated with one or more types of the data, the controller determines that the super page is suitable to store the data. If the controller determines, based on the table, that a blank super page has no single page associated with the types of the data, the controller determines that the super page is not suitable to store the data.

In response to determining that there is no blank super page suitable to store the data, the controller picks (or combines) at least one block in different planes of the memory (704), for example, based on the demand and/or according to one or more strategies for combining a super block. For example, the strategies can be based on erase count, unused block count, total valid count, total erase count, and/or erase delay time.

In some examples, the controller determines that the demand is associated with sequential write. The controller can pick the same type of blocks (SLC, MLC, TLC, or QLC), e.g., SLC for reliable data or MLC for normal data, and maximize the number of blocks from the planes to combine a super block, e.g., to maximize a bandwidth of the super block. In some cases, as SLC can be used as a nonvolatile cache to prevent data loss from power failure, the controller can put data in SLC first and then migrate to TLC (or QLC). In some cases, the controller determines, from the demand, that the sequential write includes different streams of data. The controller can combine different super blocks and separate the different streams of data into the different super blocks. For example, a super block can be configured for user data, a super block can be configured for reliable data, a super block can be configured for metadata, and a super block can be configured for mixed data.

In some examples, the controller determines that the demand is associated with different types of program data. The controller can separate different types of data into different single blocks within a super block and set up a respective erase/program feature for each single block (or page) according to the demand. For example, one or more MLC blocks are for normal data and one or more SLC blocks are for reliable data.

The controller then erases each single block by its feature decided by the demand (706). The feature can include erase/program feature for the block. For example, as noted above, if the demand needs to store reliable data, a single block can be erased as an SLC block by its feature and later be programmed to store the reliable data by the feature. If the demand needs to store normal data, a block can be erased as an MLC block. If the demand needs to store both reliable data and normal data, the controller can erase multiple blocks as a combination of SLC blocks and MLC blocks.

The controller then combines the erased single blocks from the planes to a super block, where single pages in the single blocks from the planes are combined to a super page (708). The super page can be used to store the data associated with the demand. The controller can then proceed to perform step 606 of FIG. 6.

Figure 8:
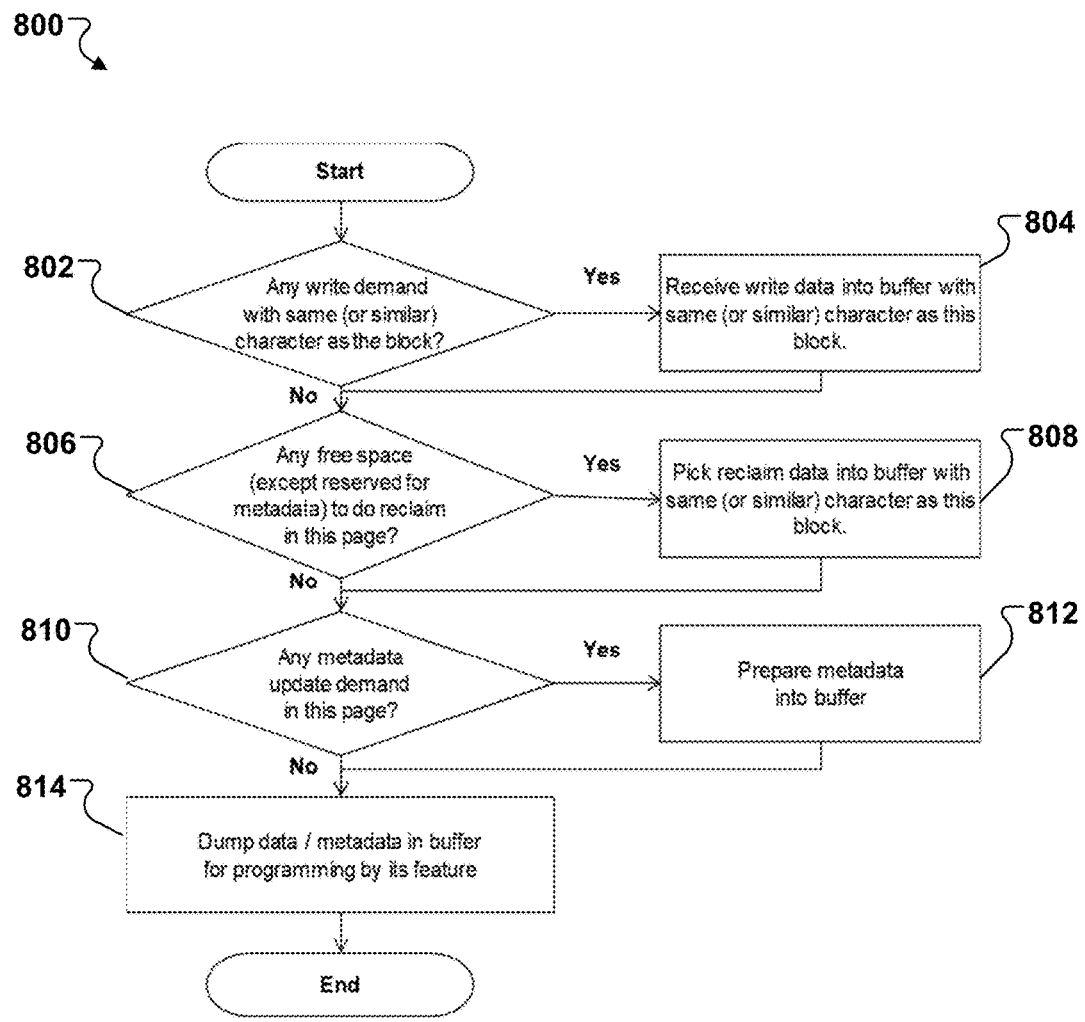
FIG. 8 illustrates an example of a process for preparing data to program a single page within a super page, according to one or more implementations.

FIG. 8 illustrates an example of a process 800 for preparing data to program a single page within a super page. The process 800 can be performed as step 606 of FIG. 6 by the controller of FIG. 6. The data is associated with a write/reclaim demand, e.g., the demand of FIG. 6. The super page can be the allocated super page of FIG. 7. The super page includes a number of single pages from respective single blocks of different planes in the combined super block of FIG. 7. The process 800 is to prepare data for a single page of a single block in the super page.

The controller determines whether there is any data in the demand having the same (or similar) characteristic as the single block (or the single page) (802). For example, a characteristic of the data corresponds to a characteristic of the single block (or the single page). As noted above, the controller can store a table associating different types of data with different types of blocks (or pages). In some cases, if the data includes reliable data and the single block is an SLC block, then the controller determines that the data in the demand has the same (or similar) characteristic as the single block. If the data includes reliable data, and the single block is an MLC block, then the controller determines that the data does not have the same (or similar) characteristic as the single block. In some cases, if the data is categorized as hot data and the single block is configured for (or is suitable for) storing hot data, then the controller determines that the data in the demand has the same (or similar) characteristic as the single block. For example, the single block can have a small erase count that is suitable for storing hot data. If the data is categorized as hot data and the single block is configured for storing cold data or not suitable for storing hot data, then the controller determines that the data in the demand does not have the same (or similar) characteristic as the single block.

If the controller determines that the data in the demand has the same (or similar) characteristic as the single block, the controller receives write data with the same (or similar) characteristic as the block (804). In some cases, the controller can determine whether there is any other write data in the demand having the same (or similar) characteristic as the block and/or whether there is any write data in another demand having the same (or similar) characteristic as the block. All the data in the demand can come from the host, and can be received into a buffer in memory for use in programming later.

Then the process 800 proceeds to step 806, where the controller determines whether there is any free space (except those reserved for metadata) to do reclaim (or "garbage collection") in the single page (806). In such a way, the controller can maximize a programming bandwidth of the super page and thus an efficiency of the memory. The reclaim is for migrating valid data from one or more victim blocks. In some cases, in step 804, if the controller determines that the data in the demand does not have the same (or similar) characteristic as the single block, the process 800 also proceeds to step 806.

If the controller determines that there is free space to do reclaim in the single page, the controller picks the reclaim data with the same (or similar) as the block (808). For example, if the block is configured (or suitable) for storing hot data, the controller picks the reclaim data categorized as hot data. If the block is an SLC block, the controller picks the reclaim data categorized as reliable data such as system data or secure data. If the block is an MLC block, the controller picks the reclaim data categorized as user data.

Then, the process 800 proceeds to step 810, where the controller determines whether there is any metadata update demand in this page (810). In some cases, in step 806, if the controller determines that there is no free space to do reclaim in the single page, the process 800 also proceeds to step 810.

If the controller determines that there is metadata update demand in this page, the controller prepare metadata into a buffer (812). Then the controller dumps data and/or metadata in the buffer for programming by the single page's program feature (814). The controller can fill in the write data in the single page. The controller can arrange the write data in the demand in part of the single page, e.g., a number of memory cells, and the reclaim data in the rest of the single page.

In some cases, in step 810, if the controller determines that there is no metadata update demand in the page, the process 800 also proceeds to step 814. The controller can repeat the process 800 as illustrated in FIG. 6 to prepare data for all the single pages in the super page.

Figure 9:
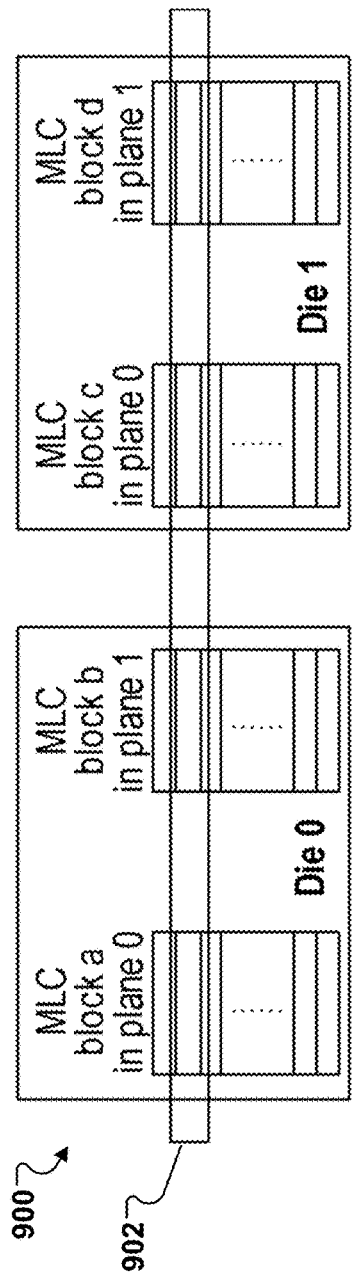
FIG. 9 illustrates an example of allocating a super page for sequential write, according to one or more implementations.
Figure 10:
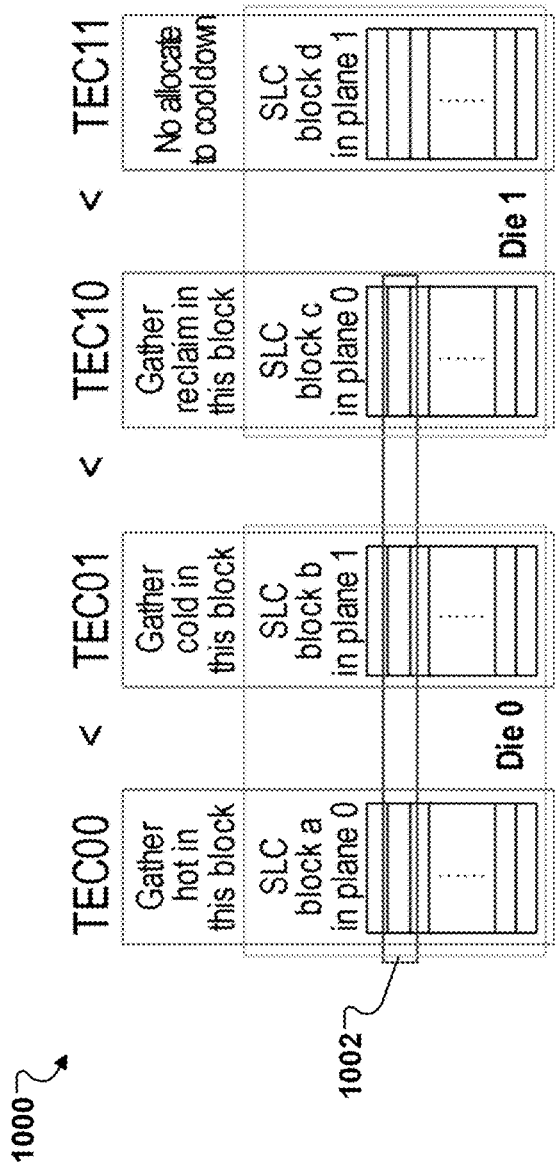
FIG. 10 illustrates an example of allocating a super page for mixed types of data, according to one or more implementations.
Figure 11:
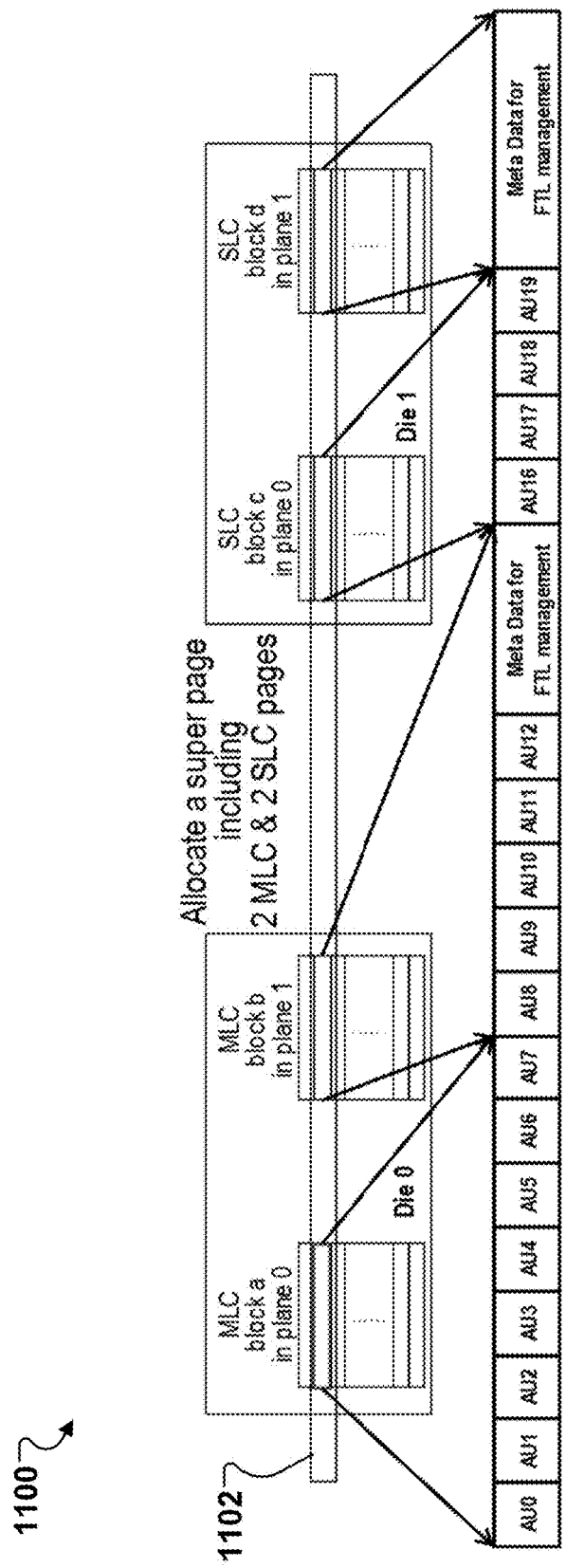
FIG. 11 illustrates an example of allocating a super page including mixed types of blocks for mixed data, according to one or more implementations.

FIGS. 9-11 illustrates examples of allocating a super page and arranging data in the super page. Each example can be performed by a controller, e.g., the controller 112 of FIG. 1, coupled to a memory, e.g., the memory 116 of FIG. 1.

FIG. 9 illustrates an example 900 of allocating a super page for a sequential write demand, e.g., from a host device such as the host device 120 of FIG. 1. The controller can determine that the demand is for sequential write that includes a large amount of data. In some examples, the controller can determine a length of data associated with the demand. If the length is longer than a predetermined threshold, e.g., 128 kB, the controller determines the demand is for sequential write. In some examples, the demand includes a hint indicating sequential write, and the controller can determine that the demand is for sequential write from the hint. The controller can allocate, e.g., according to the process 700 of FIG. 7, a super page 902 in a super block to store the data. The controller can maximize the number of blocks combined in the super block. All the blocks can be configured as MLC blocks.

As illustrated in FIG. 9, the super block combines four MLC blocks from four planes in two chips Die 0 and Die 1. Each page in a single block has 16 k*8 memory cells and can store 32 kB data when each memory cell is programmed as an MLC. As the super page includes four single MLC pages, the super page can be allocated for storing 128 kB data. The controller can then receive 128 kB data and arrange the data in the super page and program the super page. The data can be programmed into the super page combining the MLC pages, e.g., by full sequence method as discussed with further details in FIG. 12A.

FIG. 10 illustrates an example 1000 of allocating a super page in a super block for mixed hot, cold and reclaim data. The super block combines 3 SLC blocks from three planes in two chips Die 0 and Die 1.

The controller can maintain a block information table for each plane that includes block information of physical blocks in the plane. The controller can determine a combination of the super block according to the block information of the physical blocks in the planes and the characteristics of the data. For example, the controller can determine the combination of the super block based on total erase counts (TECs) of the blocks. In some examples, the controller determines whether TEC of a plane exceeds a threshold. If the TEC of the plane exceeds the plane, the controller does not select a block from the plane to the super block. The threshold can be determined based on empirical values or the TECs of the planes. In some implementations, the total erase count (TEC) of each plane measures the wear out status of each plane. The controller can monitor the difference between the minimum TEC and maximum TEC, and set a threshold to trigger a cool down allocation strategy based on the difference such that all the planes wear out evenly.

As illustrated in FIG. 10, the TECs of plane 0 and plane 1 of Die 0 and plane 0 and plane 1 of Die 1 are 0, 1, 10, and 11, respectively. As the TEC is too high for plane 1 of Die 1, the controller can determine not to select a block from the plane and allow the plane to cool down. Instead, the controller selects SLC block a in plane 0, Die 0 for gathering hot data, SLC block b in plane 1, Die 0 for gathering cold data, SLC block c in plane 0, Die 1 for gathering reclaim data. Thus, the controller allocates a super page 1002 which combines 3 single pages from SLC block a, SLC block b, and SLC block c. If each page includes 16 k*8 memory cells, the super page can provide 48 kB data space.

In a particular example, the controller receives 32 kB write data from a host, e.g., the host device 120 of FIG. 1, and judges (or determines) hot/cold data, e.g., by counting or delta time of update as noted above. The controller can receive 16 kB valid data from victim blocks. Then the controller can program the super page 1002 by simultaneously programming a single page in SLC block a with 16 kB hot data, a single page in SLC block b with 16 kB cold data, and a single page in SLC block c with 16 kB reclaim data.

FIG. 11 illustrates an example 1100 of allocating a super page including mixed types of blocks for mixed data. The mixed data can include normal data, e.g., from a host such as the host device 120 of FIG. 1, system data (e.g., reliable data), e.g., from the host, and metadata, e.g., for FTL management.

The controller can allocate a super page 1102 in a super block to store the mixed data. Based on the data to be written in the super page 1102, e.g., according to the process 700 of FIG. 7, the controller can combine 2 MLC blocks in Die 0 and 2 SLC blocks in Die 1 to the super block. Accordingly, the super page can combine 2 MLC pages and 2 SLC pages. The super block combines mixed SLC and MLC blocks and data can be programmed into the super block, e.g., according to LM program method as discussed with further details in FIG. 12B.

As an example, if each page includes 16 k*8 memory cells and a mapping granularity for the super block is 4 kB, each SLC page can have 4 allocation units (AUs) and each MLC page can have 8 AUs. The controller can receive normal data including X AU hot data and Y AU cold data from the host and Z AU system data from the host, where X/Y is no more than 8 and Z is no more than 4. According to the process 800 of FIG. 8, the controller can pick (8−X) hot data, (8−Y) cold data, and (4−Z) system data from victim blocks in the memory. The controller can prepare 28 kB metadata from an internal memory inside the controller, e.g., the internal memory 114 of FIG. 1, and/or from one or more other blocks in the memory. For example, the controller can prepare 12 kB metadata in block b in Die 0, plane 1 and 16 kB metadata in block d in Die 1, plane 1.

Then the controller can program the super page 1102 by simultaneously programming a single page in MLC block a with X hot normal data and (8−X) hot reclaim data in AU0 to AU7, a single page in MLC block b with Y cold normal data and (8−Y) cold reclaim data in AU8 to AU15, a single page in SLC block c with Z system data and (4−Z) reclaim system data in AU16 to AU19, and a single page in SLC block d with metadata from AU20 to AU23.

Figure 12:
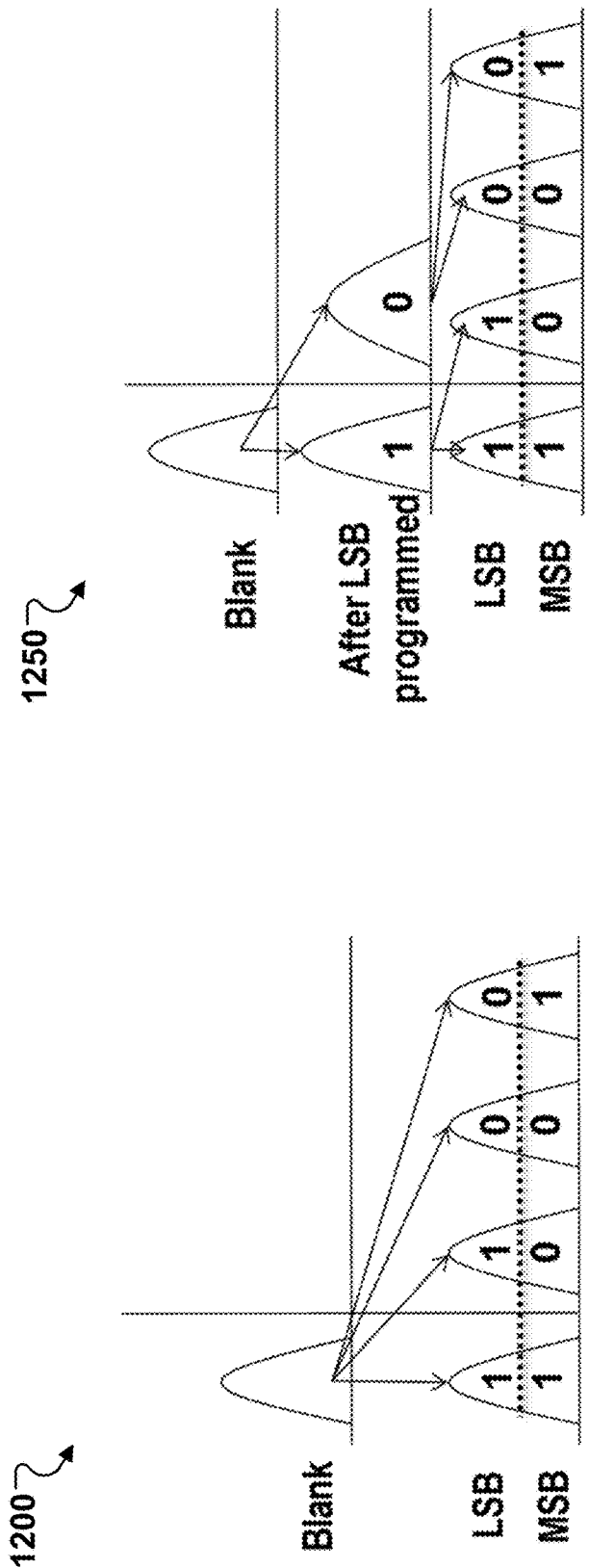
FIG. 12A illustrates an example of programming an MLC cell with a full sequence program method, according to one or more implementations.
FIG. 12B illustrates an example of programming an MLC cell with an LM program method, according to one or more implementations.

FIGS. 12A and 12B illustrate examples of programming an MLC cell with full sequence method (12A) and LM program method (12B), respectively. The methods can be performed by a controller, e.g., the controller 112 of FIG. 1, coupled to a memory, e.g., the memory 116 of FIG. 1.

For a full sequence method shown in FIG. 12A, the controller can prepare program all bits in cell (e.g., both LSB and MSB) simultaneously. Assume there are m bit cell and n*8 k cells per each word line, i.e., per single page. The single page can store m*n kB data. For full sequence method, the controller can prepare m*n kB data to program all bits per cell in the word line together. Note that in FIG. 12A, the horizontal axis is threshold voltage of cell, and the vertical axis is the cell number in each voltage. The full sequence method can split n*8 k cells from all erase states into 4 distributions by a program command. Each cell indicates only one of 11/01/00/10 state, and all 4 distributions include n*8 k cells threshold voltage status. The full sequence method can be used for programming data in an MLC block, which can improve programming efficiency.

For LM program method, the LSB of the memory cell are programmed first, and the MSB are programmed after the LSB have been programmed. For this procedure, the controller can prepare n kB data to program one bit per cell in a word line, and then program the word line m times to store m*n kB data. As shown in FIG. 12B. Once a block sets a feature to erase and program by an SLC mode, the method is different from the MLC mode. The SLC mode does not need full sequence or LM program method to encode more than 1 bit in a cell. In some cases, the controller can allocate m SLC blocks in the same plane and each SLC block has fixed space that can be programmed to store update data. In some cases, the controller can allocate a super page without SLC pages. For example, the controller can allocate a first super page including SLC pages and MLC pages, and allocate a second super page including no SLC page but MLC pages. In some cases, the controller can use LM program method to combine 2 SLC blocks in the same plane for equal page number as other MLC block (2 bit per cell) within a super block.

Figure 13:
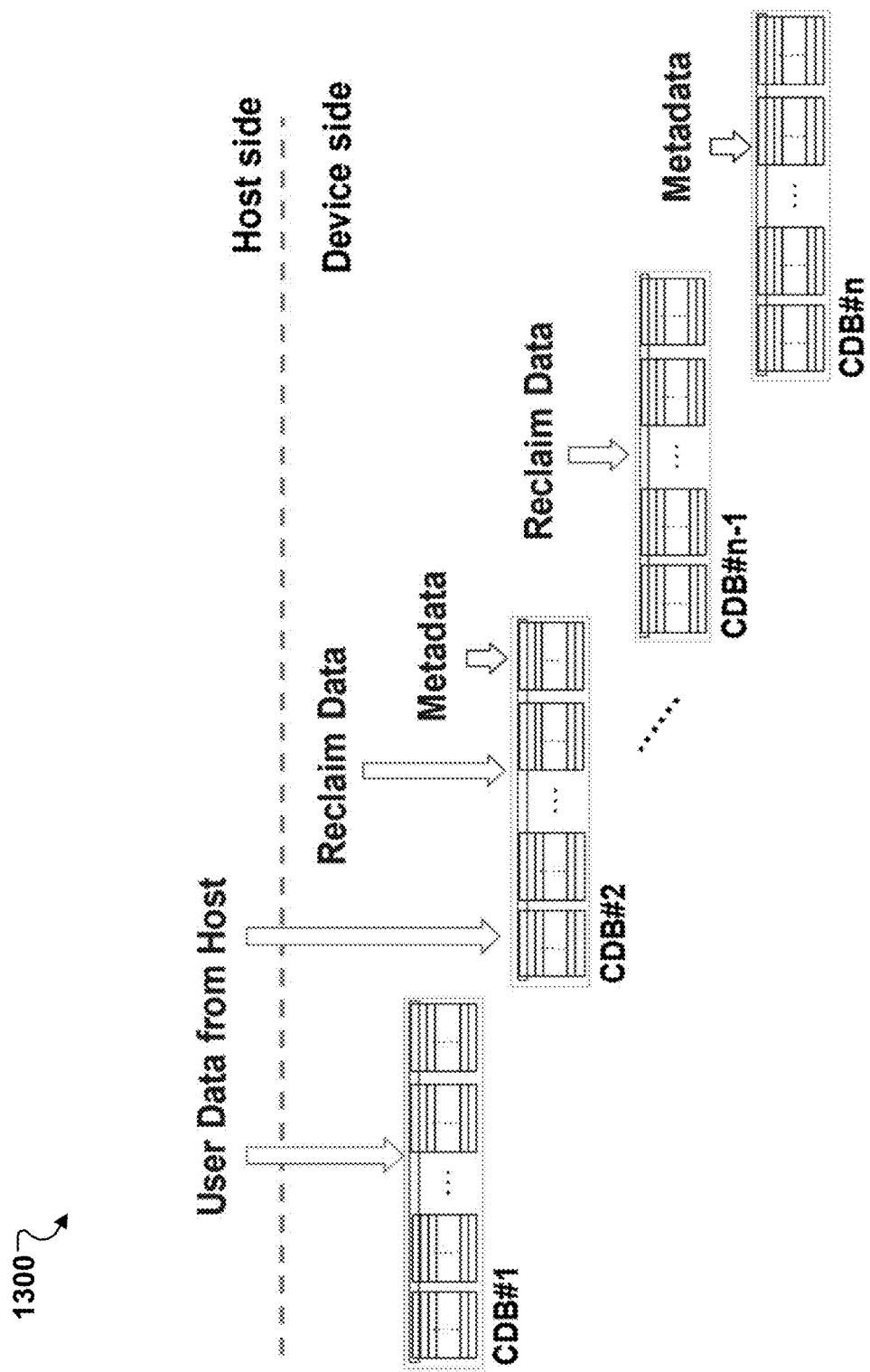
FIG. 13 illustrates an example of arranging data from both host and client sides to multiple super blocks, according to one or more implementations.

FIG. 13 illustrates an example 1300 of arranging data from both host side and device side to multiple super blocks in a memory. The host can be the host device 120 of FIG. 1, and the device can be the device 110 of FIG. 1, and the memory is the memory 116 of FIG. 1. The data arrangement can be performed by a controller, e.g., the controller 112 of FIG. 1.

Data to be written in the memory can include user data from the host, reclaim data from the memory, and metadata from the device 110 (or the memory). The controller can categorize the different types of data and combine n super blocks to arrange the data according to one or more strategies as noted above. Each super block is a current data block (CDB) including a number of single blocks from different planes in the memory.

The controller can configure different super blocks for different types of data. For example, as illustrated in FIG. 13, CDB#1 is configured for user data from the host, CDB#2 is configured for user data, reclaim data, and metadata, CDB#n−1 is configured for reclaim data, and CDB#n is configured for metadata. The controller can manage the n super blocks at the same time.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A memory controller for managing data arrangement in a memory, comprising:
    control circuitry coupled to the memory having at least two planes of physical blocks and configured to
        determine one or more characteristics of data to be written in the memory,
        allocate a super page of a super block based on the determined characteristics of the data and block information of the physical blocks of the planes, the super block combining one or more physical blocks from the planes, the super page combining one or more single pages from the corresponding one or more physical blocks in the super block,
        arrange the data to the one or more single pages in the super page, and
        program the super page to write the data in the one or more single pages.

2. The memory controller of claim 1, wherein the control circuitry is configured to allocate the super page of the super block by determining that the super block includes the super page that is blank and suitable to store the data.

3. The memory controller of claim 1, wherein the control circuitry is configured to allocate the super page of the super block by
    selecting the one or more physical blocks from the planes based on the block information of the physical blocks of the planes,
    erasing each of the selected physical blocks based on the determined characteristics of the data, and combining the one or more single pages from the one or more physical blocks in the planes to the super page.

4. The memory controller of claim 1, wherein the control circuitry is configured to arrange the data to the one or more single pages in the super page by
preparing data in a first blank single page in the super page,
determining that there is a second blank single page in the super page, and
preparing data in the second blank single page.

5. The memory controller of claim 4, wherein the control circuitry is configured to prepare data in the first blank single page by
determining that the data has a characteristic corresponding to a characteristic of a first physical block including the first blank single page, and
filling in the data in the first blank single page.

6. The memory controller of claim 4, wherein the control circuitry is configured to prepare data in the first blank single page by
in response to a determination that there is free space in the first blank single page, picking reclaim data from one or more victim blocks, the reclaim data having a characteristic corresponding to the characteristic of the first physical block; and
filling in the data and the reclaim data in the first blank single page.

7. The memory controller of claim 4, wherein the control circuitry is configured to determine that the data has the characteristic corresponding to the characteristic of the first physical block by determining at least one of
the data includes reliable data and the first physical block is an SLC block,
the data includes normal data and the first physical block is one of an MLC block, a TLC block and a QLC block, or
the data includes hot data and the first physical block has an erase count less than at least one other physical block in the super block.

8. The memory controller of claim 1, wherein the control circuitry is configured to program the super page by simultaneously programming each of the one or more single pages with the data by a respective program feature, the respective program feature of the single page corresponding to a characteristic of data arranged to the single page.

9. The memory controller of claim 8, wherein the data comprises reliable data arranged to the single page, and the single page is an SLC page.

10. The memory controller of claim 8, wherein the data comprises normal data arranged to the single page, and the single page is an MLC page, and
wherein the normal data is programmed into the single page by one of full sequence programming method and LM programming method.

11. The memory controller of claim 1, wherein the data is associated with a command, and
wherein the controller circuitry is configured to analyze the characteristics of the data according to the demand.

12. The memory controller of claim 11, wherein the demand comprises at least one of:
a write demand for writing data from a host externally coupled to the memory,
a reclaim demand for migrating valid data in at least one victim block in the memory, or
a system demand for storing metadata associated with the memory, and
wherein the data includes at least one of the data from the host, the reclaim valid data, or the metadata.

13. The memory controller of claim 11, wherein the demand comprises a sequential write demand, and
wherein the control circuitry is configured to allocate the super page of the super block by combining a maximum number of physical blocks from the planes to the super block and erasing each physical block in the super block to be a block with one type of SLC, MLC, TLC, and QLC.

14. The memory controller of claim 1, wherein the control circuitry is configured to categorize the data based on the determined characteristics of the data, and
wherein the control circuitry is configured to arrange the data to the one or more single pages in the super page by arranging the categorized data according to the determined characteristics into different singles pages in the super page, such that data with a same characteristic is gathered in a same single page.

15. The memory controller of claim 1, wherein the control circuitry is configured to categorized the data according to at least one of data source, access frequency, system or cache, or data or metadata.

16. The memory controller of claim 1, wherein the control circuitry is configured to:
determine that the data includes different types of data according to the determined characteristics of the data, and
allocate the super page of the super block by preparing a respective single page for each of the different types of the data in the super page.

17. The memory controller of claim 1, wherein the control circuitry is configured to maintain the block information of each individual physical block in the planes, and
wherein the block information of a physical block in the planes comprises one or more parameters including block type, erase count, valid count, read counts, erase delay time, a first flag indicating whether the physical block is in a current data block, and a second flag indicating whether the physical block is an unused block.

18. The memory controller of claim 1, wherein the control circuitry is configured to combine a plurality of super blocks, each of the super blocks being configured for a respective type of data.

19. A memory system comprising:
a memory comprising physical blocks; and
a controller configured to manage data arrangement in the memory by
determining one or more characteristics of data to be written in the memory,
allocating a super page of a super block based on the determined characteristics of the data and block information of the physical blocks, the super block combining one or more physical blocks from the memory, the super page combining one or more single pages from the corresponding one or more physical blocks in the super block,
arranging the data to the one or more single pages in the super page, and
programming the super page to write the data in the one or more single pages.

20. A method of managing data arrangement in a memory, comprising:
maintaining, by a control circuitry, block information of individual physical blocks in the memory;

allocating, by the control circuitry, a super page of a super block according to a demand and the block information of the physical blocks of the memory, the super block combining at least one physical block from the memory, the super page combining at least one single page from the corresponding at least one physical block in the super block;

preparing, by the control circuitry, data in the at least one single page of the super page, the data comprising data associated with the demand; and programming, by the control circuitry, the super page to write the data in the at least one single page.

* * * * *